Jan. 28, 1941.　　　　L. R. GRUSS　　　　2,229,846
SHOCK ABSORBER
Original Filed March 25, 1939　　4 Sheets-Sheet 4
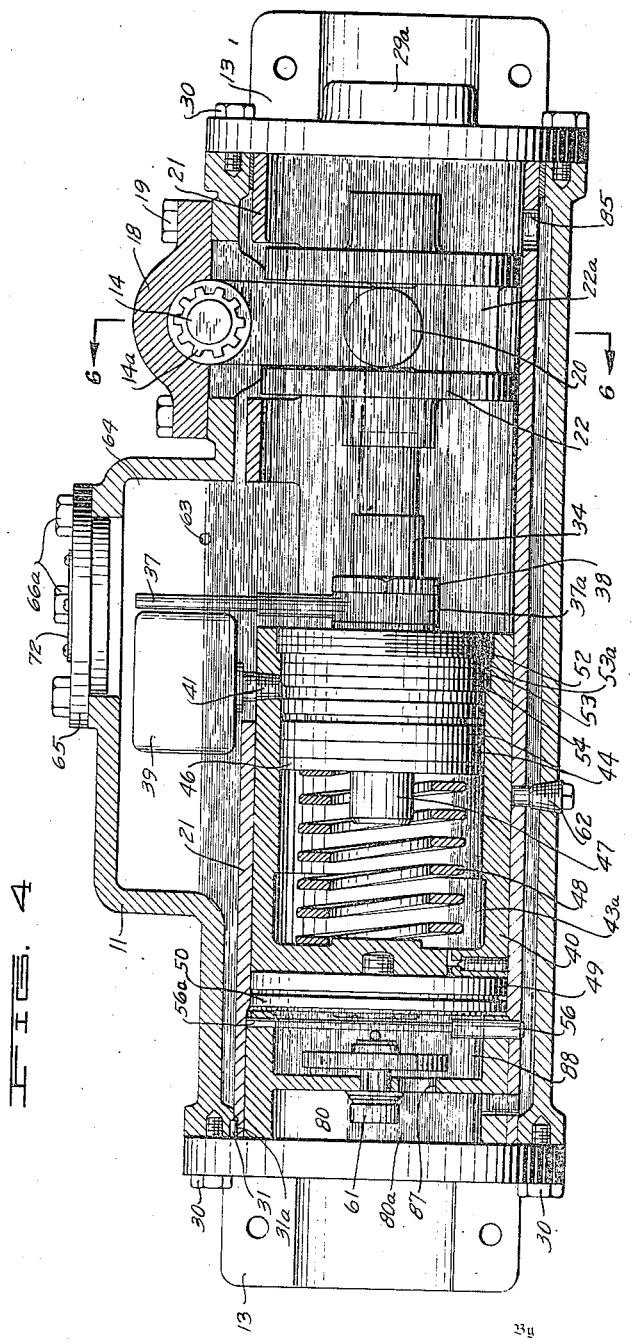
Inventor
Lucian R. Gruss
By John A. Bommhardt
Attorney Patented Jan. 28, 1941

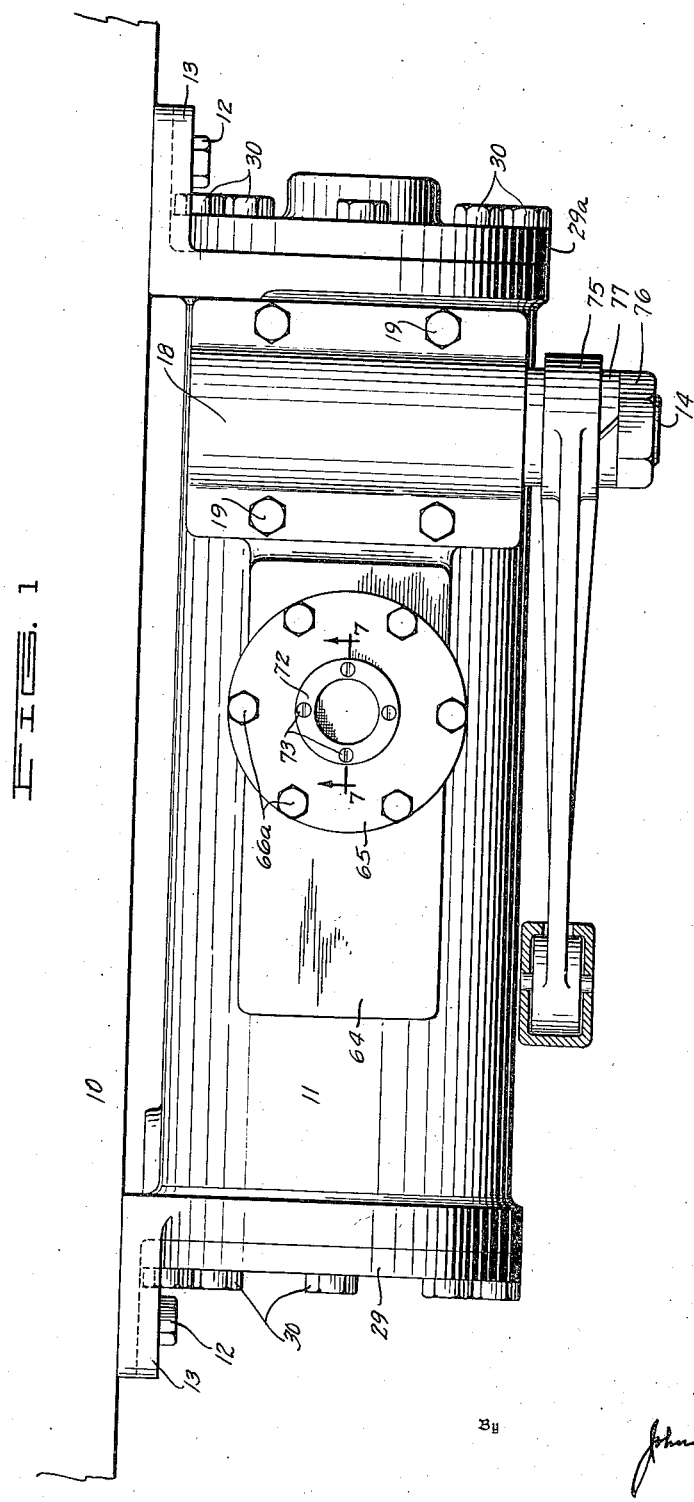

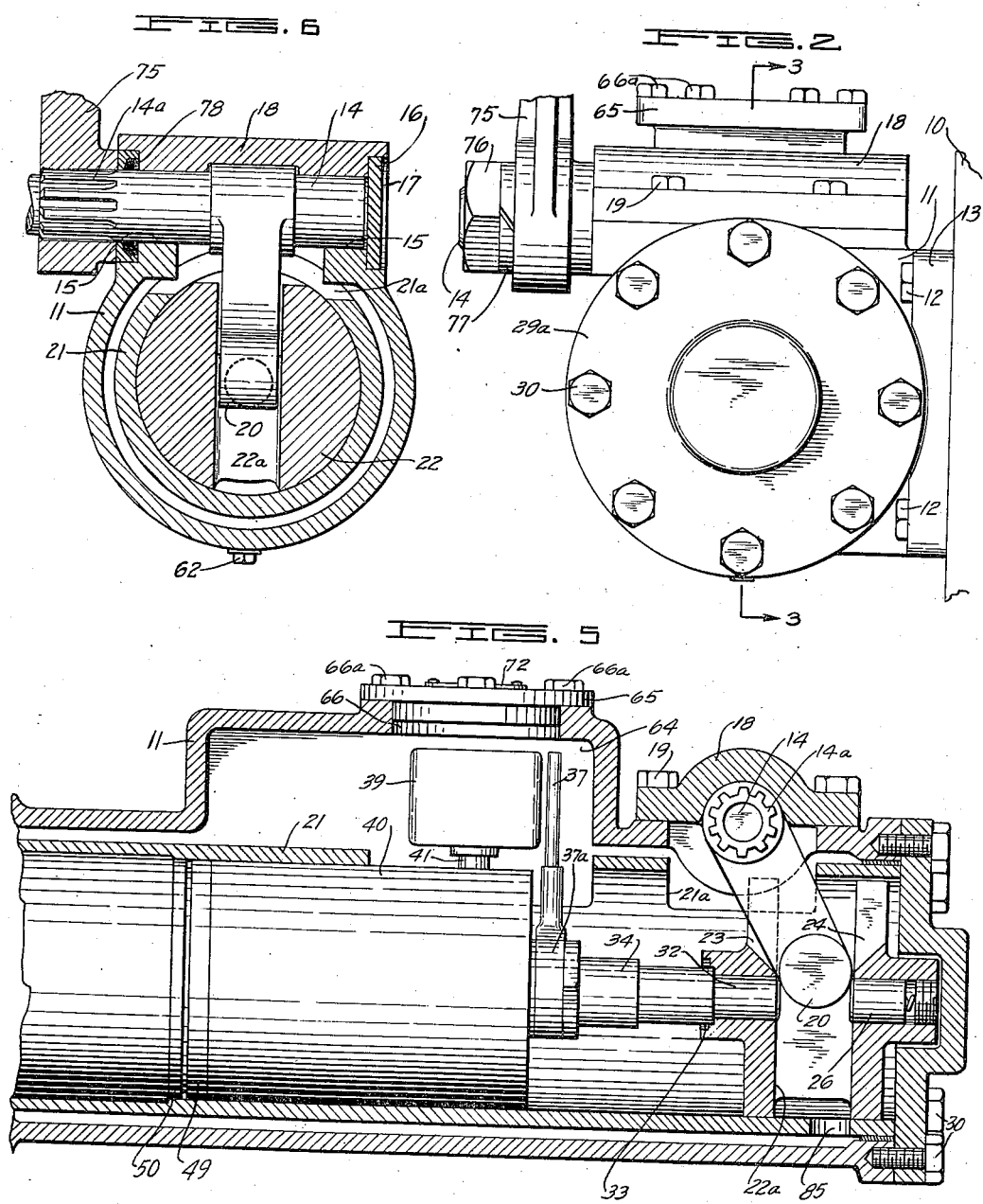

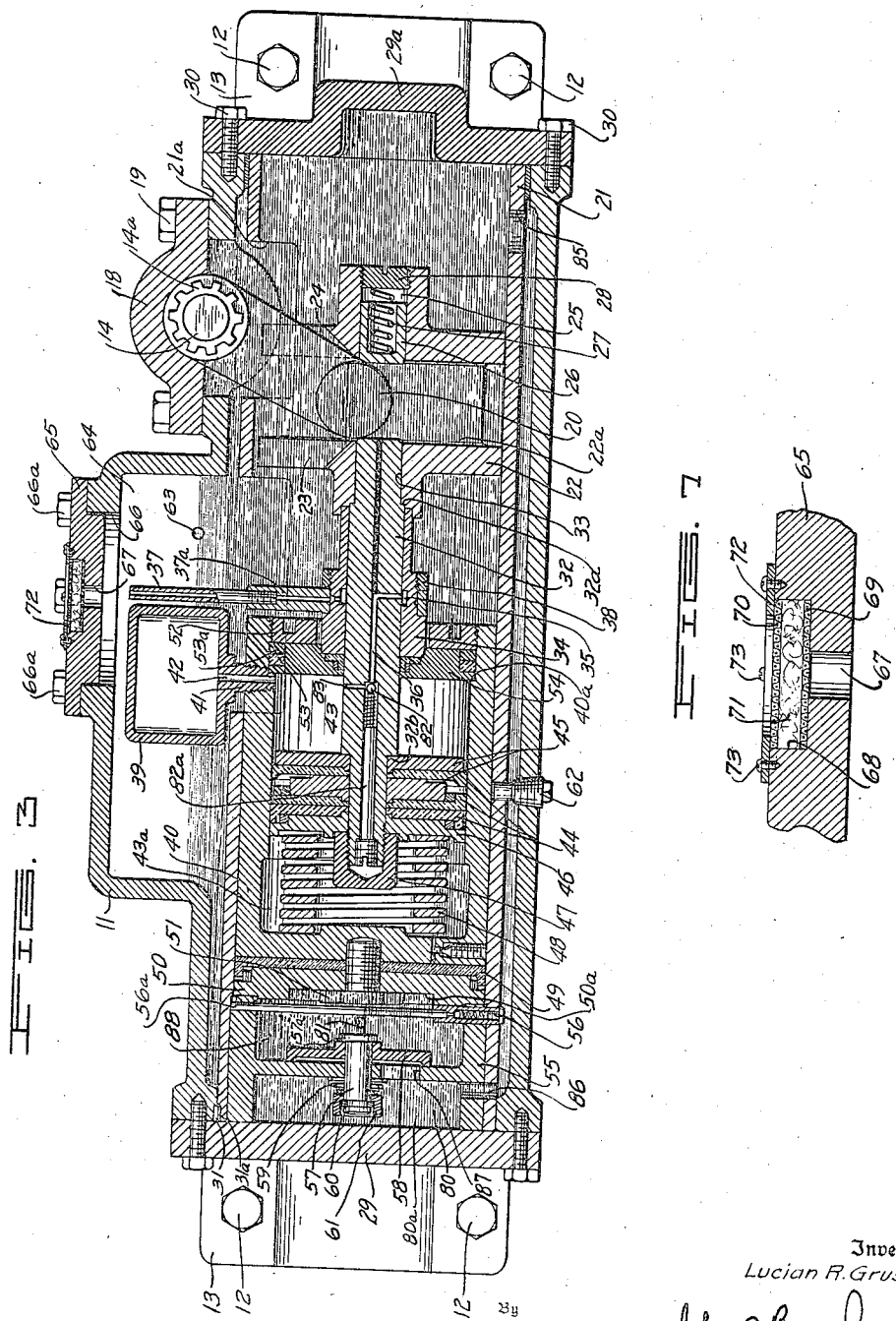

2,229,846

UNITED STATES PATENT OFFICE 2,229,846

SHOCK ABSORBER

Lucien R. Gruss, Cleveland, Ohio

Application March 25, 1939, Serial No. 264,134
Renewed June 25, 1940

11 Claims. (Cl. 267—64)

My invention relates to improvements in hydro-pneumatic shock absorbers for motor vehicles or other uses and is simpler in construction and action than my prior Patent #1,982,471, and has a single action in place of the double action shown in the said patent.

One object of my improved device is to provide an improved means for controlling the upward and downward motion of the car.

Another object is to provide a resistance against rock or sway on rough or crowned roads by providing a counter balancing means regardless of the load position.

Still another object is to provide a controlling means which follows the load line of the vehicle and adjusts itself automatically to the loads and weights and causes the vehicle to rise slightly above its normal load line and softens the spring action.

These and other objects and advantages may be noted from the following specification and its accompanying illustrations in which:

Fig. 1 is a top plan view of the device.

Fig. 2 is an end view of Fig. 1.

Fig. 3 is a longitudinal section taken on line 3—3 of Fig. 2, with the cross head thrust inwardly against the piston on the compression stroke.

Fig. 4 is a section similar to Fig. 3, partly in elevation, the cross head being shown in neutral position, with the oil release valve in open position.

Fig. 5 is a partial view similar to Figs. 3 and 4 with the cross head thrust outwardly on the expansion stroke of the piston.

Fig. 6 is a transverse section taken on line 6—6 of Fig. 4.

Fig. 7 is an enlarged fragmentary section of the breather on line 7—7 of Fig. 1.

Again referring to the illustrations: A vehicle frame is indicated by the numeral 10 to which is secured a housing 11 by bolts 12 through flanges 13.

A rocker arm shaft 14 is mounted in a split bearing recess 15 in the housing 11, the outer end of the said shaft being splined at 14a and extending outwardly from the recess 15, the opposite end being held within the aperture by a retaining ring 16 mounted in the shouldered opening 17, a top bearing cover 18 being secured over the rocker arm shaft 14 and to the housing 11 by bolts 19.

A rocker arm 20 is mounted midway of the shaft 14 and extends downwardly through an aperture 21a in a cylinder 21 and projects within a slot 22a in a sliding cross-head 22, said rocker arm being cradled therein and moving within the sloping grooves 23 and 24 in the top part of the cross-head at opposed sides of the slot 22a as the said rocker arm pivots with the splined rocker arm shaft 14.

The sliding cross-head 22 has a shock cushioning device mounted within a bore 25 in the outer wall of the said cross-head, and said device consists of an inverted metal cup 26 having a spring 27 mounted therein, and a retaining plug 28 screwed in the threaded end of the bore 25.

The cylinder 21 is mounted within the housing 11 and held therein by end covers 29 and 29a secured to the housing by bolts 30, and a key 31 in the keyway 31a prevents the turning of the cylinder 21 within the housing 11.

A piston rod 32 has one end fixed within an aperture 33 in one portion of the cross-head 22 and opposed to the aperture 25 in the opposite portion of said cross-head, said piston rod being shouldered at 32a to limit the forward thrust of said piston rod into cross-head 22 when assembling.

The piston rod 32 extends centrally and longitudinally within the cylinder 21 through a guide 34, said guide having an oil groove 35 therein which registers with the passage 36 in the piston rod 32. Mounted over the guide 34 is an air inlet tube 37 mounted in a ring 37a secured upon said guide by a nut 38.

An air control chamber 39 is mounted in an extension of the casing above the cylinder 21 and is secured to the top surface of the hollow or trunk piston 40 by a threaded nipple 41 having an air passage 42 therethrough which registers with the equalizing air chamber 43 within the piston 40.

The piston rod 32 is shouldered at 32b and has mounted thereon forward of the shoulder a packing assembly comprising a plurality of cupleathers 44, spacers 45 and seal spacer 46, which are retained thereon by the threaded head 47 screwed on the reduced threaded end of the piston rod.

An expanding spring 48 is mounted forward of the piston rod and within the piston 40, in the air cushion chamber 43a in the piston, one end pressing against the inner wall of the piston head and the opposed end pressing against the recessed surface of the inner spacer 45.

A cup leather 49 is pressed against the outer surface of the piston head 40 and retained thereagainst by a recessed washer 50 secured to the piston head 40 by a bolt 51 within the recess 50a.

A bull ring 52 mounted over the guide 34 forward of the air inlet tube ring 37 is screwed in the threaded end of the piston 40 thus sealing the above spacers, cup leathers and springs within the hollow piston 40. An oil seal 53 is mounted over a spacer 54 forward of the bull ring 52, a steel ring 53a is also mounted over the spacer 54, between the oil seal 53 and the bull ring 52, the spacer being pressed tightly against the shoulder 40a of the piston 40 by screwing the bull ring within the threaded end of the said piston.

An oil pressure valve mounting 55 is mounted within the end of the cylinder 21 forward of the washer 50, an air relief valve 56 being mounted therethrough in a vertical position as shown in Fig. 3.

The oil pressure valve mounted through the valve mounting consists of a short stud 57 thrust through a recessed disc 58, the head 57a of said stud resting on the boss on the outside of the disc which is rearward of the valve mounting 55, and a spiral spring 59 is mounted over the stud forward of the said valve mounting and is retained thereon by a valve dog 60 and sliding head 61.

An air relief plug 62 is mounted through the bottom of the housing 11 and the cylinder 21.

An oil prime duct 63 is mounted through the housing 11 within the oil chamber 64, and a breather cap 65 is secured over the orifice 66 in said housing 11 by bolts 66a in the housing 11.

The breather cap 65 has a bore 67 therethrough over which is a recess 68, and a pair of screens 69 and 70 are mounted therein with an absorbent material 71 therebetween. A retaining ring 72 is secured over the said recess to the breather cap by screws 73.

A safety valve 81 is mounted through the housing 11 and cylinder 21. Adjustment of the safety valve 81 controls the ride action.

An operating arm 75 is mounted on the projecting splined end 14a of the shaft 14 and is retained in position by a nut 76 against a lockwasher 77, and packing 78 prevents oil leakage while the lever is operating.

In operation, the operating arm 75, being pivotally attached by the customary suitable linkage to the axle, moves up and down with the action of the car, when the shock absorber is secured to the frame 10.

The movement of the operating arm 75 swings the rocker arm 20 within the slot 22a of the sliding cross-head 22, and the thrust of the rocker arm against the inside wall of the slotted cross-head moves the said cross-head within the cylinder 21, compressing the spring 48 and the air within the piston chamber 43a. This action on the reverse movement compresses the air in the piston into the equalizing chamber 43 and forces the air through the passage 42 in the nipple 41 and into the air control chamber 39, as illustrated in Figs. 3 and 5 respectively.

The movement of the piston 40, after the housing 11 and the cylinder 21 are filled with oil to the priming duct 63, stops with the filling of the oil chamber 88, the safety valve 81 controlling the outlet of oil 80a; and the piston rod 32 is now set in motion and the forward and back thrust of the rocker arm 14 creates a pumping action on the air within the piston, the air being taken in automatically.

The air pressure thus created in the piston 40 passes the cupleathers and spacers inwardly and when it reaches a predetermined pressure is cut off by equalization of the pressure within the chamber 39. This action forms a cushion of air, the thrust of the piston rod 32 with its attached cupleathers, spacers etc., thus riding on the air within the piston 40 forward of said piston rod. This is explained in more detail in the following description:

The movement of the vehicle over road irregularities causes the axle to rise and fall above and below its riding plane or load line, the action of the shock absorbers lift the vehicle slightly, to its new load line, softening the action of the steel springs.

The air breather cap 65 permits the drawing in of conditioned air into the housing 11 by the pumping action of the piston rod 32 and piston 40 within the cylinder 21.

A ball valve 82 in the piston rod 32 regulates the air and oil leakage within the piston 40, the oil leaking into the oil duct 35 in the guide 34; and an adjusting rod 82a screwed within the end of the piston rod 32 allows a degree of adjustment to create a greater or less compression of the valve spring through the oil and air pressure on the ball within the valve.

The action of the piston rod 32, and its attached cup leathers 44 and spacers 45, moving in and out within the bull ring 52 and guide 34, forms a sliding valve action when the port 83 in the piston rod 32 is covered and uncovered by the bull ring and guide.

The air inlet tube 37 draws the air inwardly, with the suction created by the pumping action of the piston rod assembly, through the passage 36 past the ball valve 82 and outwardly through the port 83 as the piston assembly moves inwardly opening said port.

The reverse action, which causes the port 83 to close as the piston rod 32 slides within the guide 34, forces the air and oil upward, most of the air compressing within the air control chamber 39, the balance of the air and the oil 80a returning past the cupleathers 44 and spacers 45 to the air cushion chamber 43a in the piston 40 as illustrated by the position of the piston rod assembly and expanded spring 48 in Fig. 4 thus equalizing the pressure in chambers 43a and 39.

The pressure in the air cushion chamber 43a and the air control chamber 39 remains the same until the compression stroke is again made as shown in Fig. 3, upon which the air returns from the chamber 39 to the equalizing chamber 43 and falls to a pressure approximately equal to the atmospheric pressure, while that in the chamber 43a increases proportionately, the inflation action ceasing simultaneously.

The oil circulates through the aperture 85 at one end of the cylinder 21 to the lower level of the housing and is again drawn upward through the aperture 86 in the opposed end of the cylinder, and the suction caused by the action of the piston rod 32 and piston 40 in the cylinder causes the oil pressure valve 58 to open when the thrust of the rocker arm 20 is in the extreme opposed direction as illustrated in Fig. 5. The oil is thus drawn in through the aperture 87 in the valve mounting 55 to the inner chamber 88. As the rocker arm 20 swings back to its normal or neutral position as shown in Fig. 4, the oil has been drawn into the chamber 88 and the oil pressure valve closes staying closed until the thrust is again forward, any air in the chamber 88 is forced out through the air relief valve exhaust pipe 56a after a few strokes, the chamber 88 remaining full of oil at all times, which supports the piston head 40 in a floating action.

The device is capable of a variety of uses, including airplane landing gears.

I claim:

1. In a shock absorber, the combination of a casing, a cylinder therein for liquid, a rocker arm projecting into the cylinder, a cross-head working in one end of the cylinder and engaged by the rocker arm, a hollow piston working in the other end of the cylinder and having an air chamber therein, a packing assembly slidable within the hollow of the piston, a spring between the packing assembly and the piston head, a piston rod connecting the packing assembly and the cross-head, and an air equalizing chamber carried by the piston and communicating with the air chamber therein.

2. The combination stated in claim 1, and a guide through which the piston rod extends, said guide having a passage communicating with an air space in the top of the casing, and the piston rod having a port connecting said passage and the air chamber in the piston.

3. The combination stated in claim 1, the casing having an extension in the top forming an air chamber, and means to supply air from said chamber to the air chamber in the piston.

4. The combination stated in claim 1, the casing having an oil passage communicating with opposite ends of the cylinder, and an automatic valve controlling the flow of oil from said passage into the space between the piston and the end of the cylinder.

5. In a shock absorber, the combination of a cylindrical casing, a cylinder held lengthwise within the casing and spaced from the side wall thereof, a rock shaft projecting through the wall of the casing and provided with a rocker arm projecting into one end of the cylinder, said casing and cylinder being adapted to hold a liquid, a cross-head working in one end of the cylinder in the liquid therein and engaged by the rocker arm, a hollow piston slidable in the other end of the cylinder and having an air chamber therein, a packing assembly slidable in the hollow of the piston, a compression spring between the piston head and said assembly, a piston rod having an operative connection between the packing assembly and the cross-head, and an air-control chamber located within the upper part of the casing and movable with the piston and communicating with the air chamber in the piston.

6. The combination stated in claim 5, the end of the piston opposite the piston head having a guide fixed therein through which the piston rod is slidable, said guide having an air connection to the said chamber in the upper part of the casing and the piston rod having a port communicating with said connection and opened and closed by the movement of the piston rod in the guide.

7. The combination stated in claim 5, the end of the piston opposite the piston head having a guide fixed therein through which the piston rod is slidable, said guide having an air connection to the said chamber in the upper part of the casing and the piston rod having a port communicating with said connection and opened and closed by the movement of the piston rod in the guide, and an adjustable check valve in the piston rod, controlling said port.

8. The combination stated in claim 5, the oil space between the cylinder and the casing having ports communicating with opposite ends of the cylinder, and an automatic valve controlling the admission of oil from one of said ports into the end of the cylinder adjacent the piston head.

9. The combination stated in claim 1, the cross-head having a spring-supported bearing where it is engaged by the rocker arm.

10. In a shock absorber the combination of a cylinder adapted to contain oil or the like, a rocker arm projecting into one end of the cylinder, a cross-head slidable in the cylinder and engaged by the rocker arm, a hollow piston slidable in the other end of the cylinder, said piston having an air chamber therein, and an operative connection between the cross-head and the piston, said connection including a piston rod, an air compressing structure carried by the piston rod within the air chamber in the piston, and a compression spring between said structure and the piston head, and means to supply air to the air chamber in the piston.

11. The combination stated in claim 5, the casing having at the top an extension forming an air space above the liquid and an air inlet for outside atmosphere to said space.

LUCIEN R. GRUSS.